United States Patent
Bain

(10) Patent No.: US 11,494,341 B2
(45) Date of Patent: Nov. 8, 2022

(54) INTER-PROCESS COMMUNICATION IN A MULTI-TENANT ENVIRONMENT

(71) Applicant: International Business Machines Corporation, Armonk, NY (US)

(72) Inventor: Peter D. Bain, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/691,654

(22) Filed: Nov. 22, 2019

(65) Prior Publication Data
US 2020/0097448 A1 Mar. 26, 2020

Related U.S. Application Data

(63) Continuation of application No. 14/842,926, filed on Sep. 2, 2015, now Pat. No. 10,528,526, which is a
(Continued)

(51) Int. Cl.
*G06F 16/17* (2019.01)
*G06F 16/178* (2019.01)
(Continued)

(52) U.S. Cl.
CPC ............. *G06F 16/178* (2019.01); *G06F 9/52* (2013.01); *G06F 9/54* (2013.01); *G06F 16/2343* (2019.01);
(Continued)

(58) Field of Classification Search
CPC . G06F 9/54; G06F 9/52; G06F 16/178; G06F 16/2343; G06F 16/24575; G06F 16/275
See application file for complete search history.

(56) References Cited

U.S. PATENT DOCUMENTS 5,202,988 A * 4/1993 Spix ..................... G06F 8/41
709/234
6,349,342 B1 2/2002 Menges
(Continued)

FOREIGN PATENT DOCUMENTS

CN 101069157 A 11/2007
CN 101702784 A 5/2010
(Continued)

OTHER PUBLICATIONS

IBM, "List of IBM Patents or Patent Applications Treated as Related", Appendix P, 2 pages, dated Nov. 25, 2019.
(Continued)

*Primary Examiner* — Pierre M Vital
*Assistant Examiner* — Andrew N Ho
(74) *Attorney, Agent, or Firm* — Michael A. Petrocelli

(57) ABSTRACT

A tool for inter-process communication in a multi-tenant environment. The tool creates an advertisement file for each tenant of a plurality of tenants. The tool locks a plurality of synchronization files prior to incrementing a semaphore, wherein the plurality of synchronization files correspond to the plurality of tenants, and wherein locking the plurality of synchronization files ensure that the semaphore is only decremented once per tenant. The tool searches for a response file corresponding to a specific tenant, wherein the response file includes metadata related to an information channel for communication with the specific tenant and information depicting a communication protocol used corresponding to the specific tenant. The tool unlocks the plurality of synchronization files. The tool establishes a connection, wherein the connection comprises an encrypted communication channel between the specific tenant and the attachment process mediated by a daemon.

20 Claims, 8 Drawing Sheets

Related U.S. Application Data continuation of application No. 14/662,389, filed on Mar. 19, 2015, now Pat. No. 10,528,525.

(51) Int. Cl.
| | | |
|---|---|---|
| *G06F 9/54* | (2006.01) | |
| *G06F 9/52* | (2006.01) | |
| *G06F 16/27* | (2019.01) | |
| *G06F 16/23* | (2019.01) | |
| *G06F 16/2457* | (2019.01) | |

(52) U.S. Cl.
CPC ...... *G06F 16/24575* (2019.01); *G06F 16/275* (2019.01)

(56) References Cited

U.S. PATENT DOCUMENTS

| | | | |
|---|---|---|---|
| 7,117,481 B1 | 10/2006 | Agesen | |
| 7,188,343 B2 | 3/2007 | Sanchez, II | |
| 7,353,515 B1 | 4/2008 | Ton | |
| 8,286,188 B1 | 10/2012 | Brief | |
| 8,429,144 B2 | 4/2013 | Bain | |
| 8,793,691 B2 | 7/2014 | Devadhar | |
| 2002/0138706 A1 | 9/2002 | Hugly | |
| 2002/0199057 A1 | 12/2002 | Magnussen | |
| 2003/0115476 A1* | 6/2003 | McKee | G06F 9/52 713/193 |
| 2003/0120878 A1* | 6/2003 | Andreassen | G06F 13/364 711/152 |
| 2003/0217152 A1* | 11/2003 | Kasper, II | G06F 16/2343 709/226 |
| 2004/0221246 A1* | 11/2004 | Emerson | G06F 9/52 710/4 |
| 2004/0260890 A1* | 12/2004 | Hoogerbrugge | G06F 9/52 711/150 |
| 2005/0025303 A1 | 2/2005 | Hostetler | |
| 2005/0065925 A1 | 3/2005 | Weissman | |
| 2005/0080963 A1* | 4/2005 | Schopp | G06F 9/526 710/200 |
| 2006/0161741 A1* | 7/2006 | Yasue | G06F 9/526 711/152 |
| 2006/0259913 A1 | 11/2006 | Wenzel | |
| 2007/0226686 A1* | 9/2007 | Beardslee | G06F 9/54 717/109 |
| 2008/0162481 A1 | 7/2008 | Sadjadi | |
| 2008/0307139 A1 | 12/2008 | Thomas | |
| 2009/0328041 A1* | 12/2009 | Sudzilouski | G06F 9/526 718/100 |
| 2010/0153397 A1 | 6/2010 | Barabas | |
| 2011/0154368 A1* | 6/2011 | Banks | G06F 9/526 719/316 |
| 2011/0161599 A1* | 6/2011 | Craske | G06F 12/0831 711/141 |
| 2011/0283266 A1 | 11/2011 | Gallagher | |
| 2011/0302133 A1* | 12/2011 | Kuruganti | H04L 67/06 707/608 |
| 2012/0016855 A1 | 1/2012 | Bain | |
| 2012/0101983 A1 | 4/2012 | Hopmann | |
| 2012/0102067 A1 | 4/2012 | Cahill | |
| 2012/0192194 A1* | 7/2012 | Richardson | G06F 9/526 718/103 |
| 2013/0139172 A1 | 5/2013 | An | |
| 2015/0012962 A1 | 1/2015 | Walsh | |
| 2016/0274956 A1 | 9/2016 | Bain | |
| 2016/0275097 A1 | 9/2016 | Bain | |

FOREIGN PATENT DOCUMENTS

| | | |
|---|---|---|
| CN | 101777047 A | 7/2010 |
| CN | 107431687 A | 12/2017 |
| WO | 2016147076 A1 | 9/2016 |

OTHER PUBLICATIONS

"International Search Report and The Written Opinion", International Application No. PCT/IB2016/051270, International filing date Mar. 7, 2016, 11 pages.

Whitehead, Peter, "Multitenancy and the Multi Tenant Java Virtual Machine", Session AAD-1357, IBM, Impact 2014, Be First, Apr. 27-May 1, The Venetian—Las Vegas, NV, #ibmimpact, copyright 2014 IBM Corporation.

\* cited by examiner

INTER-PROCESS COMMUNICATION IN A MULTI-TENANT ENVIRONMENT

BACKGROUND OF THE INVENTION

The present invention relates generally to inter-process communication, and more specifically to inter-process communication within a multi-tenant environment. Multi-tenancy refers to a software paradigm that enables a single instance of a program, known as a daemon, to serve multiple tenants. A tenant is any application that needs its own secure or exclusive virtual computing environment.

Within a multi-tenant architecture, a daemon provides every tenant a dedicated share of its resources, including data, configuration, user management, individual functionality and non-functional properties. One challenge in facilitating inter-process communication in a multi-tenant environment is that each tenant is not a distinct process

SUMMARY

As disclosed herein, a method, executed by a computer, for inter-process communication in a multi-tenant environment includes creating an advertisement file for each tenant of a plurality of tenants; locking a plurality of synchronization files prior to incrementing a semaphore, wherein the plurality of synchronization files correspond to the plurality of tenants, and wherein locking the plurality of synchronization files ensure that the semaphore is only decremented once per tenant; responsive to a determination that the semaphore for the plurality of tenants is greater than zero, searching for a response file corresponding to a specific tenant, wherein the response file includes metadata related to an information channel for communication with the specific tenant and information depicting a communication protocol used corresponding to the specific tenant; responsive to detecting the response file, unlocking the plurality of synchronization files; and responsive to detecting the response file, establishing a connection, wherein the connection comprises an encrypted communication channel between the specific tenant and the attachment process mediated by a daemon.

DETAILED DESCRIPTION

Embodiments of the present invention relate generally to inter-process communication, and more specifically to inter-process communication within a multi-tenant environment. Inter-process communication necessarily involves communication between two processes, a target process and an attachment process. The target process may be a daemon, or a tenant running inside of a daemon. The attachment process is any process that is initiating communication with the target process, and is referred to as an attachment process because it attaches to the target process.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
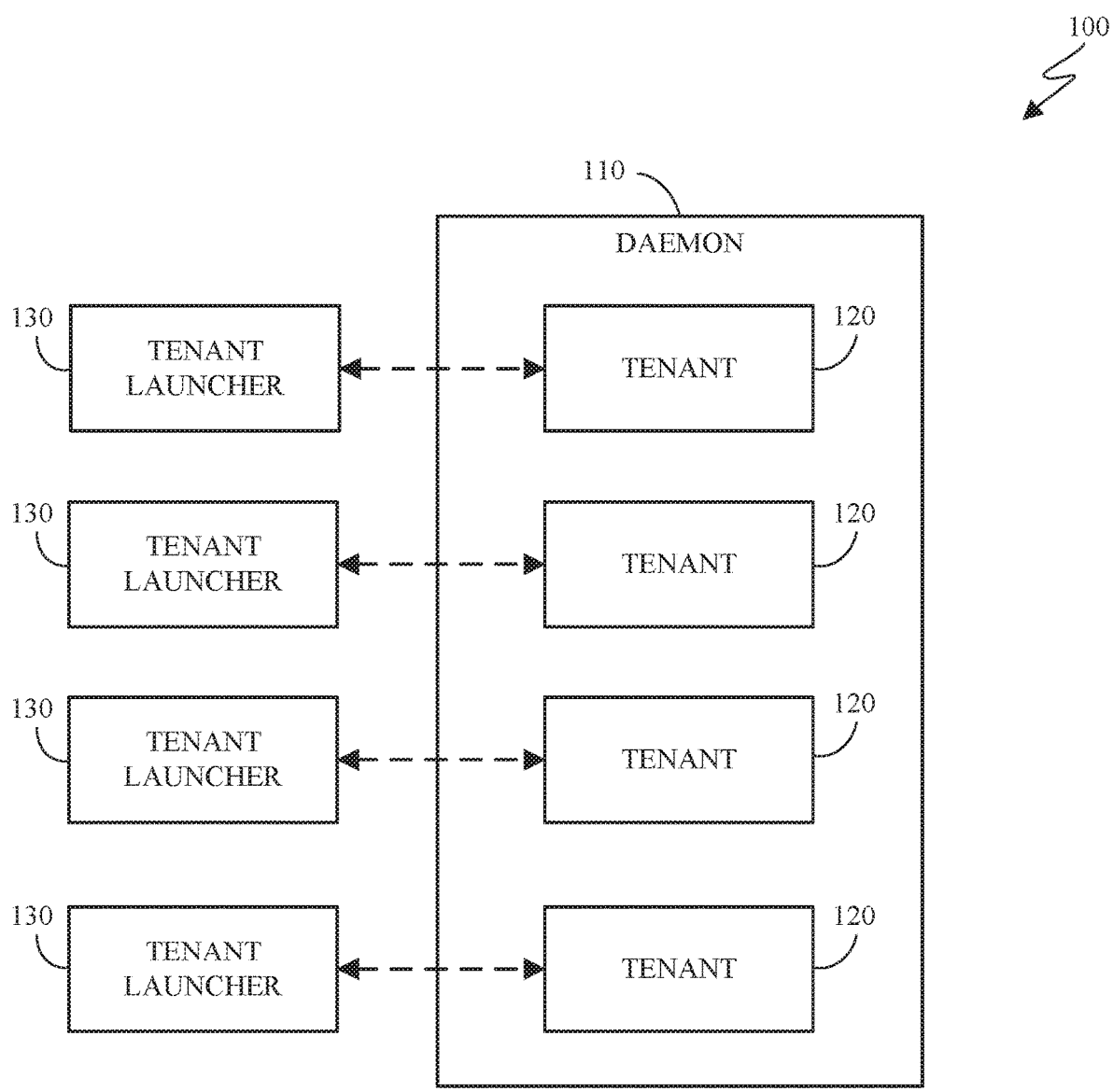
FIG. 1 is a block diagram of one embodiment of a multi-tenant environment, in accordance with the present invention.

FIG. 1 is a block diagram of one embodiment of a multi-tenant environment 100 in which the present invention may be deployed. As depicted, the multi-tenant environment 100 includes a daemon 110, tenants 120, and tenant launchers 130. FIG. 1 depicts one daemon 110 and four tenants 120 for clarity; however, it should be noted that a multi-tenant environment 100 may have several daemons 110 associated with one or more tenants 120.

In some embodiments, a daemon 110 allocates system resources to tenants 120 executing within the daemon 110. These system resources may include memory, bandwidth, processor time, and/or storage. The relationship between a daemon 110 and its tenants 120 enables users to run multiple applications (e.g., one application per tenant) in a single operating system process, i.e., the daemon 110. Each tenant launcher 130 is a process that is separate from the daemon 110. In certain embodiments, a tenant launcher 130 responds to a request to start a new application by launching a tenant 120 in a daemon 110. As depicted in FIG. 1, the dashed arrows indicate a relationship between a tenant launcher 130 and the tenant 120 that it launched.

Figure 2:
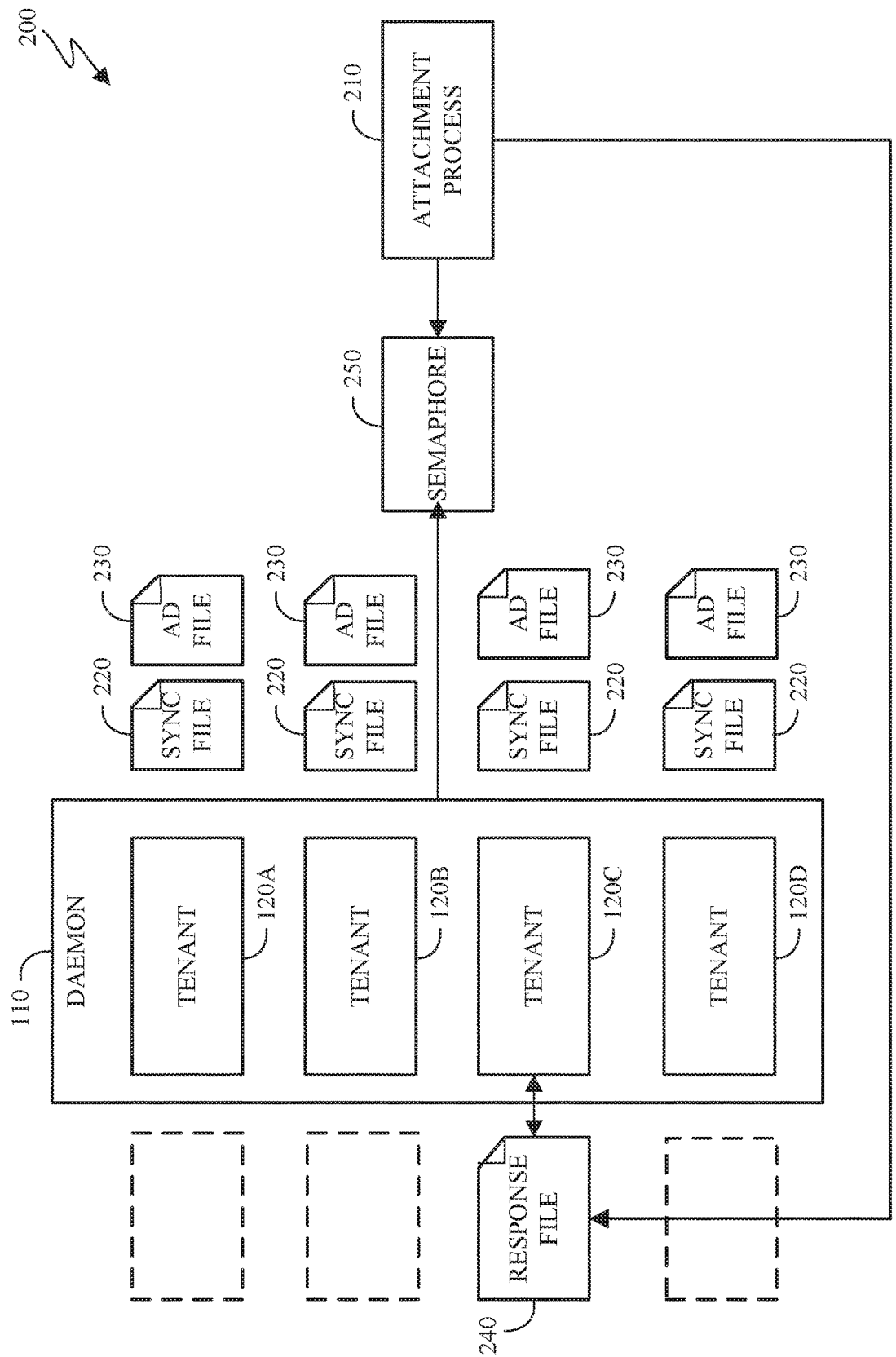
FIG. 2 is a block diagram of one embodiment of inter-process communication in a multi-tenant environment, in accordance with the present invention.

FIG. 2 is a block diagram of one embodiment of inter-process communication in a multi-tenant environment 200 in accordance with the present invention. As depicted, the multi-tenant environment 200 includes a daemon 110, tenants 120 (shown as 120A-120D), attachment process 210, synchronization files 220, advertisement files 230, response file 240, and semaphore 250. In the depicted embodiment, the attachment process 210 is seeking to establish a connection with a tenant 120C by creating a response file 240 in the tenant's directory.

The attachment process 210 refers broadly to any process that is attempting to establish communication with a tenant 120. As depicted, the attachment process 210 is seeking to communicate with a particular tenant 120C executing within the daemon 110. In certain embodiments, the attachment process 210 attaches to one tenant at a time. An attachment process 210 may lock a master lock file prior to attempting to establish a connection in order to prevent race conditions with other attachment processes. Thus, if an attachment process 210 finds that the master lock file is already locked, it will be unable to connect to a target process until the master lock file is unlocked.

Each daemon 110 and tenant 120 has an associated synchronization file 220 and advertisement files 230. In some embodiments, locking a synchronization file 220 blocks the process with which it is associated. In one embodiment, the synchronization files 220 are locked by the attachment process 210 prior to incrementing the semaphore such that all target processes are synchronized. The advertisement file 230 enables an attachment process 210 to find the particular tenant 120 with which to connect. In one embodiment, the advertisement file 230 advertises its associated target by having a filename that corresponds to the process number of the target. In some embodiments, the synchronization file 220 and advertisement file 230 may be merged as a single file.

The response file 240 may be created by an attachment process 210 in a location accessible by a specific tenant 120C. In some embodiments, the response file 240 is placed in the directory of the specific tenant 120C. The response file 240 may contain information relating to the inter-process communication that will take place between the tenant 120 and attachment process 210. For example, the response file 240 may indicate metadata about inter-process communication such as a particular information channel for the connection, (e.g. the port, socket, or memory address used). The response file 240 may also include information about the communication protocol that is used (e.g. TCP, UDP, or shared memory protocols).

The semaphore 250 may be used to control the daemon's operations and to enforce operational atomicity. In some embodiments, the daemon 110 is blocked when the semaphore 250 has a value of zero. The semaphore 250 may contain a numerical value, such as an integer, that is decremented upon an atomic operation. In one embodiment, the daemon 110 atomically seeks a response file 240 corresponding to a tenant 120. While a daemon 110 has access to the semaphore, a tenant 120 running within a daemon may not have access; in such an embodiment, the daemon 110 acts on behalf of its tenants 120 to decrement the semaphore.

Figure 3:
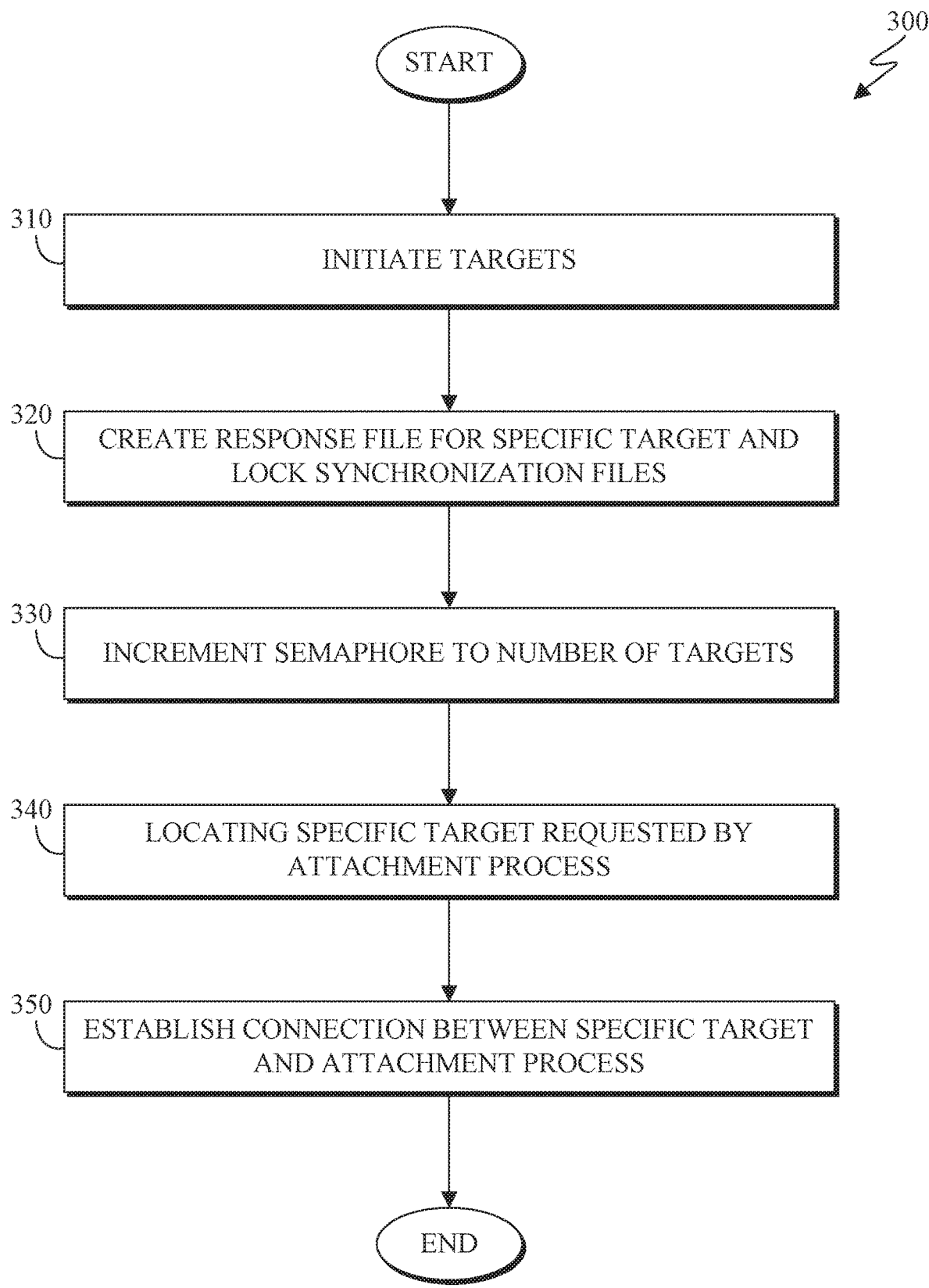
FIG. 3 is a flowchart of one embodiment of a method for inter-process communication, in accordance with the present invention.

FIG. 3 is a flowchart of one embodiment of an inter-process communication method 300 from a system-level perspective in accordance with the present invention. As depicted, the inter-process communication method 300 includes initiating (310) targets, creating (320) a response file 240, incrementing (330) the semaphore, locating (340) the specific target, and establishing (350) a connection. The inter-process communication method 300 may enable a daemon to act on behalf of tenants 120 in order to form a connection between an attachment process 210 and particular tenant 120C.

Initiating (310) targets may include establishing a multi-tenant environment by launching multiple tenants 120 within one or more daemons 110. In some embodiments, initiating (310) targets may include creating synchronization files 220 and advertisement files 230 that correspond to the tenants. A semaphore shared by all of the daemons may also be provided. In one embodiment, the daemon creates the synchronization files 220 and/or advertisement files 230 for each tenant.

Creating (320) a response file may include creating a response file 240 for a specific target and locking the synchronization files 220. In one embodiment, the attachment process 210 determines which specific tenant 120C to connect to, and writes a response file 240 into a location accessible by the tenant 120C. In some embodiments, the attachment process 210 creates a response file 240 in the directory of tenant 120C. The attachment process 210 may find the location accessible by the tenant 120C (i.e., the location in which to create the response file 240) via the tenant's 120C advertisement file 230. In certain embodiments, the advertisement files 230 are discoverable by the attachment process 210 and are used to direct the attachment process 210 to a tenant 120. The attachment process 210 may lock the synchronization files 220 of the tenants in order to prevent the target processes from decrementing the semaphore more than once.

Incrementing (330) the semaphore may include incrementing the semaphore 250 by an integer equal to the number of targets in the multi-tenant environment. In some embodiments, the attachment process 210 counts the number of targets to arrive at a target count, and then sets the semaphore 250 equal to the target count. In one embodiment, the attachment process arrives at the target count by counting all of the advertisement files 230. The daemon may provide its own synchronization file 220 and advertisement file 230 as well (not shown in FIG. 2). In such embodiments, the target count would be calculated by adding the advertisement file 230 of each tenant 120 and daemon 110. For example, in the depicted embodiment, the semaphore is set to five, since there are four tenant advertisement files 230 plus one daemon advertisement file (not shown).

Locating (340) the specific target may include using a daemon 110 to locate the specific tenant 120C. In some embodiments, the daemon 110 searches each tenant 120's directory for the response file 240; each time that the daemon 110 searches in the directory of a tenant 120, the daemon 110 also decrements the semaphore 250 by one. This may go on until the semaphore 250 is fully decremented to zero, or the response file 240 is discovered, or both. In some embodiments, once the daemon 110 finds the response file 240, the attachment process 210 unlocks the synchronization files 220 of the tenants 120.

Establishing (350) a connection may include establishing a connection between the specific target and the attachment process. In some embodiments, the daemon prepares and/or enables the specific tenant 120C to connect to the attachment process 210. The prior operation of the inter-process communication method 300 communicates the intent to establish this connection. In one embodiment, information necessary to establishing the connection is contained within, and communicated via, the response file 240.

Figure 4:
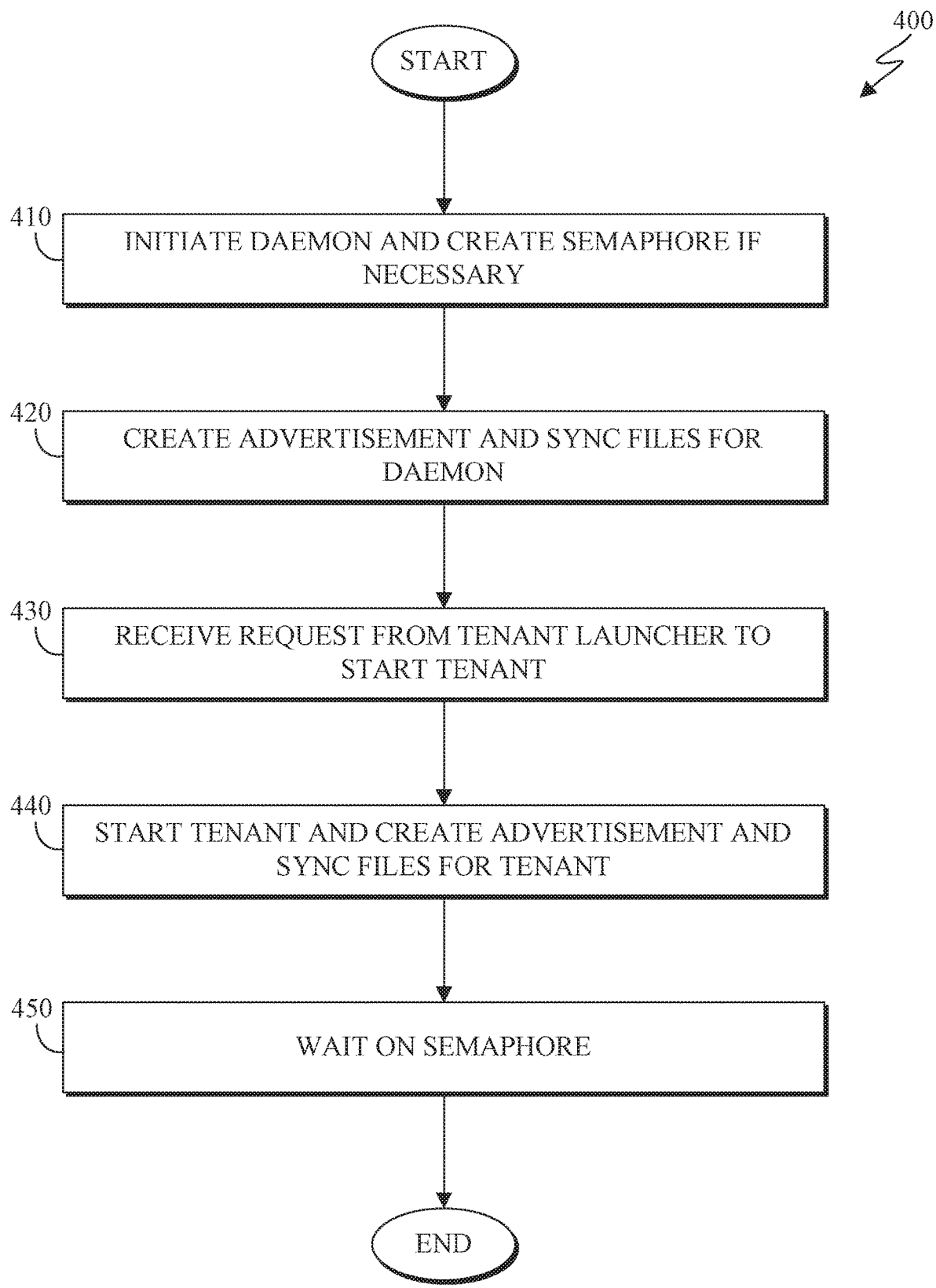
FIG. 4 is a flowchart of one embodiment of a method for establishing a multi-tenant environment, in accordance with the present invention.

FIG. 4 is a flowchart of one embodiment of a multi-tenant initialization method 400 in accordance with the present invention. As depicted, the environment establishing method 400 includes initiating (410) a daemon, creating (420) advertisement and synchronization files for the daemon, receiving (430) a request to start a tenant, starting (440) a tenant, and waiting (450) on the semaphore. This multi-tenant environment establishing method 400 may run each time that a tenant 120 is initialized. In a particular embodiment, the environment initialization method 400 is used to conduct the target initiating operation 310 depicted in FIG. 3.

Initiating (410) a daemon may include starting a daemon capable of hosting multiple tenants, creating a semaphore if necessary, and mediating inter-process communication between one of its tenants and an external attachment process. In a particular embodiment, there is one semaphore 250 that serves all of the daemons (if there are multiple daemons), and each daemon 110 interacts with the semaphore 250 for itself and on behalf of its tenants 120. In some embodiments, a semaphore 250 may not exist yet; if this is the case, a daemon 110 may provide the multi-tenant environment with a semaphore 250.

Creating (420) advertisement and synchronization files for the daemon may include the daemon 110 writing both a synchronization file 220 and an advertisement file 230 in its own directory or in a location accessible by the daemon 110. The daemon 110's synchronization file 220 and advertisement file 230 may function in the same manner as a tenant 120's synchronization files 220 and advertisement files 230 function. For example, the daemon 110's advertisement file 230 may broadcast the existence of the daemon 110 by having a filename that corresponds to the daemon 110's process ID.

Receiving (430) a request may include receiving from a tenant launcher a request to start a tenant. The request may include information particular to the tenant 120 being launched, such as resource information relating to the tenant 120's function, memory requirements, processor requirements, and/or bandwidth requirements. In some embodiments, this resource information is delivered to the daemon 110 by the tenant launcher 130, or determined by the daemon 110.

Starting (440) a tenant may include creating advertisement files 220 and synchronization files 230 for the tenant and setting aside resources for the tenant 120 whose launching was requested by the tenant launcher 130. In one embodiment, these resources meet the requirements of the tenant 120 as laid out in the resource requirements delivered by the tenant launcher 130. In addition to initializing the tenant 120, the daemon 110 also creates both synchronization files 220 and advertisement 230 files corresponding to the tenant 120.

Waiting (450) on the semaphore may include blocking the daemon 110 such that it does not search for a response file 240. In some embodiments, the daemon 110 waits on the semaphore for as long as the condition exists that the semaphore 250 value is equal to zero. Subsequent to operation 450 the method terminates.

Figure 5:
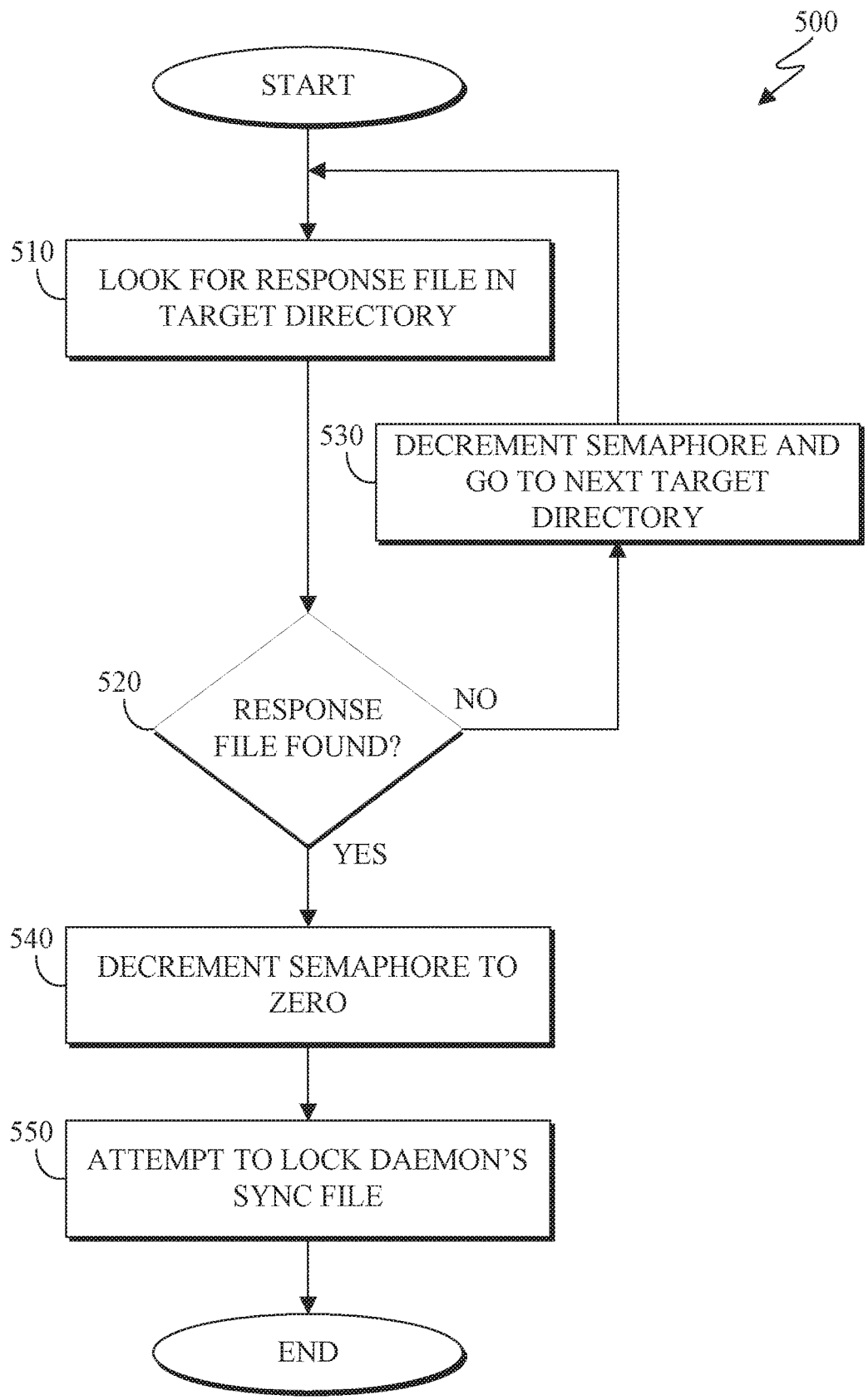
FIG. 5 is a flowchart of one embodiment of a search method in accordance with the present invention.

FIG. 5 is a flowchart of one embodiment of a search method 500 in accordance with the present invention. As depicted, the search method 500 includes looking (510) for a response file, determining (520) whether a response file has been found, decrementing (530) the semaphore, decrementing (540) the semaphore to zero, and attempting (550) to lock the daemon's synchronization file. In some embodiments, the search method 500 is performed by a daemon 120. This search method 500 may be executed in conjunction with the target locating operation 340 of the inter-process communication method 300 in FIG. 3. The search method 500 may be used to find a response file 240 corresponding to a particular tenant 120C, which thus enables a daemon 110 to mediate communication between that tenant 120C and the attachment process 210. In a particular embodiment, the environment establishing method 400 conducts the target initiation operation 310 that is depicted in FIG. 3.

Looking (510) for a response file may include searching in a location accessible by a tenant 120 for a response file 240. The location may include any directory in which the daemon 110 is programmed to search for a response file 240 for a tenant 120; for example, a tenant 120 may span several directories and there may be a particular directory that is designated as the response file directory for that tenant 120.

Determining (520) whether a response file has been found may yield two outcomes: either there is a response file 240 in the tenant 120's directory, or there is not. If there is not a response file, then the search method 500 continues by decrementing (530) the semaphore and going to the next target directory. If, however, the response file 240 is found, then the search method 500 proceeds by decrementing (540) the semaphore to zero.

Decrementing (530) the semaphore occurs when no response file 240 is found, at which point the search method 500 goes to the next target directory. The semaphore may be decremented by one integer value; thus, the semaphore is decremented once each time that operations 510-530 complete a loop. The daemon 120 may also move to the next tenant 110 directory and loop to the operation of looking (510) for a response file in the target directory. In this manner, each tenant directory may be systematically inspected for the presence of a response file 240. For example, in the depicted multi-tenant environment of FIG. 2, the response file 240 is in the directory of tenant 120C; thus, the search method 500 would not detect a response file in the directory of tenant 120A, so the daemon decrements (530) the semaphore and goes to the next target directory, i.e., the directory of tenant 120B. Again, no response file 240 is found, so the daemon 120 proceeds to the directory of tenant 120C.

When a response file is found, the method proceeds by decrementing (540) the semaphore to zero. In some embodiments, the semaphore is decremented by the daemon 110 in which the tenant 120 is executing. Instead of decrementing the semaphore once (as in the semaphore decrementing operation 530), since the response file 240 has been found, the semaphore 250 is decremented to zero. Decrementing (540) the semaphore to zero may block processes with which the semaphore 250 is associated.

Attempting (550) to lock the daemon's synchronization file may include the daemon attempting to lock its own synchronization file. However, the daemon 120 may not actually be able to lock its synchronization file 220 since the attachment process 210 has locked the file already. Subsequent to operation 550 the method terminates.

Figure 6:
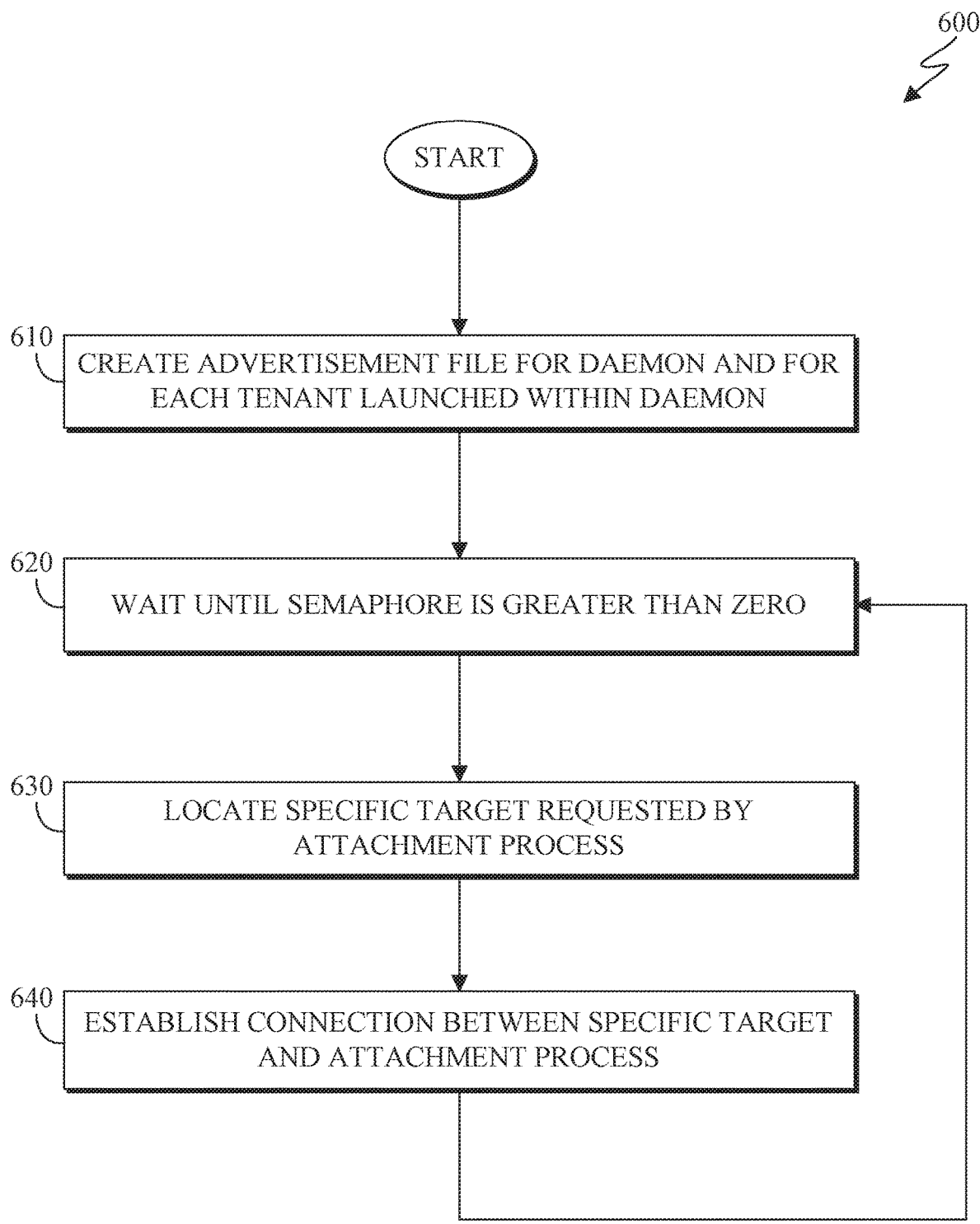
FIG. 6 is a flowchart of one embodiment of a method for inter-process communication, in accordance with the present invention.

FIG. 6 is a flowchart of one embodiment of an inter-process communication method 600 in accordance with the present invention. As depicted, the inter-process communication method 600 includes creating (610) an advertisement file, waiting (620) for the semaphore, locating (630) a specific target, and establishing (640) a connection. This inter-process communication method 600 is presented from the perspective of a daemon, which performs all of the operations of the method.

Creating (610) may include creating an advertisement file corresponding to the daemon and/or to each tenant launched within the daemon. In one embodiment, the daemon 120 writes an advertisement file 230 corresponding to itself and to each of its tenants; each advertisement file 230 may have a filename that corresponds to the process ID (or other such identifier) of the target with which it is associated. In this manner, the advertisement file 230 advertises the presence of its corresponding target.

Waiting (620) for the semaphore may include waiting until the semaphore is greater than zero, and blocking all of the processes for as long as the condition exists that the semaphore has a value equal to zero. In some embodiments, only when the semaphore is incremented will the method continue. In one embodiment, the daemon 110 blocks itself as well as any tenants 120 with which the daemon 110 is associated.

Locating (630) the specific target requested by the attachment process may include finding which target 120 has been indicated as the specific target 120C with which the attachment process is attempting a connection. In some embodiments, the specific target is located by locating the response file 240 associated with that target 120. In a particular embodiment, the locating operation 630 is performed by executing the search method 500 depicted in FIG. 5.

Establishing (640) a connection may include connecting the specific target and the attachment process. The connection establishing operation 640 may occur after the daemon has determined the specific target 120C to which the attachment process 210 seeks to connect. In some embodiments, the response file 240 contains details regarding the connection's duration, protocol, port numbers, memory addresses used, or other such details. For example, the response file 240 may indicate that the connection shall be formed at a certain time and/or be maintained for a certain duration. As another example, the attachment process 210 may request via the response file 240 that the communication conform to a particular protocol and/or use a particular encryption. In some embodiments, the daemon 120 mediates all communications between the specific tenant 120C and the attachment process 210.

Figure 7:
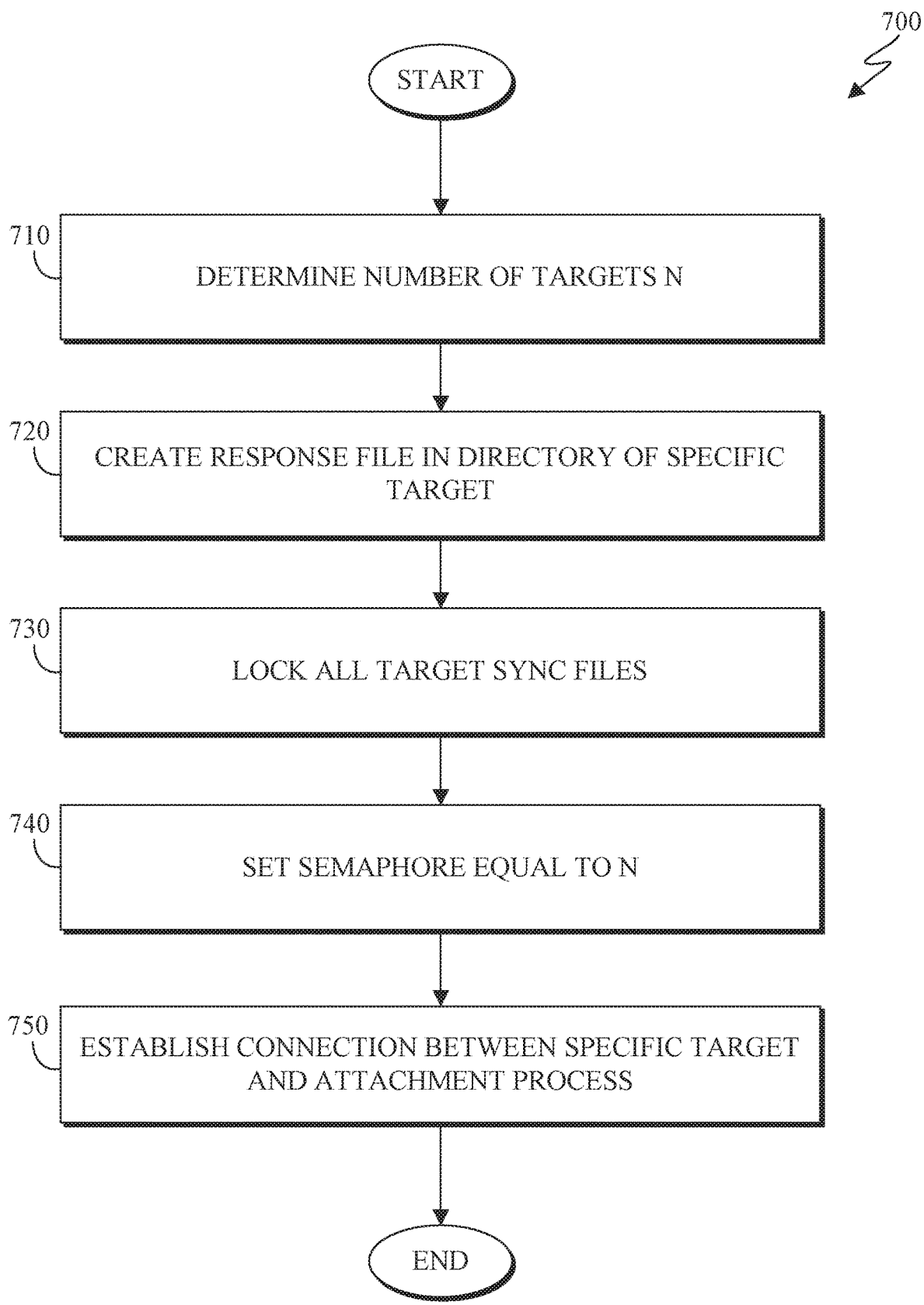
FIG. 7 is a flowchart of one embodiment of a method for inter-process communication in accordance with the present invention.

FIG. 7 is a flowchart of one embodiment of an inter-process communication method 700 in accordance with the present invention. As depicted, the inter-process communication method 700 includes determining (710) the number of targets N, creating (720) a response file, locking (730) synchronization files, setting (740) the semaphore equal to N, and establishing (750) a connection. This inter-process communication method 700 is presented from the perspective of an attachment process, which may perform all of the depicted operations.

Determining (710) the number of targets N may include counting the number of tenants and/or tenants plus daemons. In some embodiments, the attachment process arrives at the number N by counting the advertisements files 230 of each target. In other embodiment, each daemon 110 sends to the attachment process the number of tenants 120 for which the daemon 110 is responsible.

Creating (720) a response file may include the attachment process creating the response file 240 in a location corresponding to a specific target 120C. In certain embodiments, the response file 240 contains metadata regarding the connection that will be formed between the attachment process 210 and target 120C. This metadata may include details about the connection's protocol, encryption, compression, quality, duration, bandwidth, addresses, schedule, or the like.

Locking (730) the synchronization files may include locking all target synchronization files 220 in order to prevent the targets from decrementing the semaphore multiple times each. In some embodiments, the locking operation 730 prevents race conditions and ensures that the semaphore 250 is decremented only once per target.

Setting (740) the semaphore equal to N may involve the attachment process 210 writing to, rewriting over, or otherwise incrementing the semaphore 250 such that the value of the semaphore 250 is set equal to N. In some embodiments, setting the semaphore 250 equal to N unblocks the processes, so that the synchronization files 230 are locked prior to incrementing the semaphore 250.

Establishing (750) a connection between the specific target and the attachment process may include the attachment process connecting to the tenant 120C either directly or via the tenant's daemon 120. In some embodiments, the particular details of this connection are contained in the response file 240. For example, the response file 240 may indicate that the connection shall be formed at a certain time and/or be terminated after a certain duration. In some embodiments, the daemon 120 mediates all communications between the specific tenant 120C and the attachment process 210.

Figure 8:
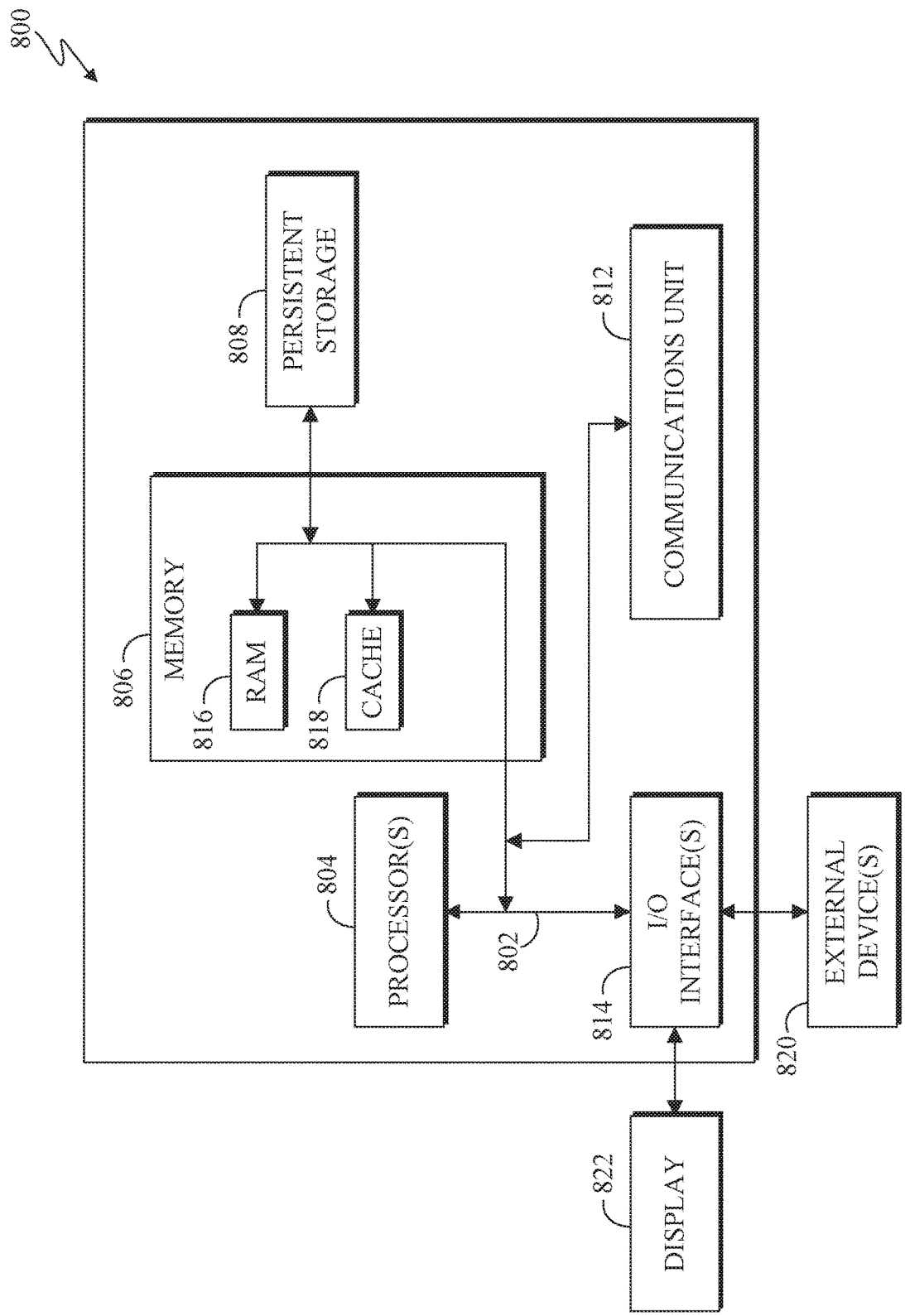
FIG. 8 is a block diagram depicting one example of a computing apparatus (i.e., computer) suitable for executing the methods disclosed herein.

FIG. 8 is a block diagram depicting one example of a computing apparatus (i.e., computer) suitable for executing the methods disclosed herein.

The foregoing methods enable inter-process communication in a multi-tenant environment. FIG. 8 is a block diagram depicting components of a computer 800 suitable for executing the methods disclosed herein. The computer 800 may be one embodiment of the multi-tenant environment 800 depicted in FIGS. 1 and 2. It should be appreciated that FIG. 8 provides only an illustration of one embodiment and does not imply any limitations with regard to the environments in which different embodiments may be implemented. Many modifications to the depicted environment may be made.

As depicted, the computer 800 includes communications fabric 802, which provides communications between computer processor(s) 804, memory 806, persistent storage 808, communications unit 812, and input/output (I/O) interface(s) 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In the depicted embodiment, memory 806 includes random access memory (RAM) 816 and cache memory 818. In general, memory 806 can include any suitable volatile or non-volatile computer readable storage media.

One or more programs may be stored in persistent storage 808 for execution by one or more of the respective computer processors 804 via one or more memories of memory 806. The persistent storage 808 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links.

I/O interface(s) 814 allows for input and output of data with other devices that may be connected to computer 800. For example, I/O interface 814 may provide a connection to external devices 820 such as a keyboard, keypad, a touch screen, and/or some other suitable input device. External devices 820 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 808 via I/O interface(s) 814. I/O interface(s) 814 may also connect to a display 822. Display 822 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for inter-process communication in a multi-tenant environment, the method comprising:
   creating a file for each tenant of a plurality of tenants;
   locking a master lock file prior to establishing a connection with the plurality of tenants, wherein locking the master lock file includes blocking an attachment process until a semaphore for the plurality of tenants is greater than zero;
   locking a plurality of synchronization files prior to incrementing the semaphore, wherein the plurality of synchronization files correspond to the plurality of tenants, and wherein locking the plurality of synchronization files ensures that the semaphore is only decremented once per tenant;
   responsive to a determination that the semaphore for the plurality of tenants is greater than zero, searching for a response file corresponding to a specific tenant, wherein the response file includes metadata related to an information channel for communication with the specific tenant and information depicting a communication protocol used corresponding to the specific tenant;
   responsive to detecting the response file, unlocking the plurality of synchronization files; and
   responsive to detecting the response file, unlocking the master lock file and subsequently establishing the connection with the plurality of tenants based, at least in part, on the response file, wherein the response file communicates to a daemon an intent to establish the connection and includes information for establishing the connection.

2. The method of claim 1, further comprising:
   responsive to detecting the response file, resetting the semaphore to a value of zero.

3. The method of claim 1, wherein the connection is established at a pre-determined time and is terminated after a pre-determined duration.

4. The method of claim 1, wherein the response file contains instructions enabling an attachment process to establish the connection with the specific tenant.

5. The method of claim 1, further comprising:
   counting a plurality of targets to provide a target count;
   creating a response file in a location accessible to a specific target; and
   establishing a connection with the specific target.

6. The method of claim 5, wherein counting the plurality of targets includes counting a plurality of files, wherein each file corresponds to one target.

7. The method of claim 1, further comprising:
   incrementing the semaphore by an integer equal to a target count, wherein the target count is calculated by adding the file for each tenant of the plurality of tenants to a file for the daemon.

8. A computer program product for inter-process communication in a multi-tenant environment, the computer program product comprising:
   one or more computer readable storage devices and program instructions stored on the one or more computer readable storage devices, the stored program instructions comprising:
   program instructions to create a file for each tenant of a plurality of tenants;
   program instructions to lock a master lock file prior to establishing a connection with the plurality of tenants, wherein locking the master lock file includes blocking an attachment process until a semaphore for the plurality of tenants is greater than zero;
   program instructions to lock a plurality of synchronization files prior to incrementing the semaphore, wherein the plurality of synchronization files correspond to the plurality of tenants, and wherein locking the plurality of synchronization files ensures that the semaphore is only decremented once per tenant;
   program instructions to, responsive to a determination that the semaphore for the plurality of tenants is greater than zero, search for a response file corresponding to a specific tenant, wherein the response file includes metadata related to an information channel for communication with the specific tenant and information depicting a communication protocol used corresponding to the specific tenant;
   program instructions to, responsive to detecting the response file, unlock the plurality of synchronization files; and
   program instructions to, responsive to detecting the response file, unlock the master lock file and subsequently establish the connection with the plurality of tenants based, at least in part, on the response file, wherein the response file communicates to a daemon an intent to establish the connection and includes information for establishing the connection.

9. The computer program product of claim 8, the stored program instructions further comprising program instructions to:
   responsive to detecting the response file, reset the semaphore to a value of zero.

10. The computer program product of claim 8, wherein the connection is established at a pre-determined time and is terminated after a pre-determined duration.

11. The computer program product of claim 8, wherein the response file contains instructions enabling an attachment process to establish the connection with the specific tenant.

12. The computer program product of claim 8, the stored program instructions further comprising program instructions to:
   count a plurality of targets to provide a target count;
   create a response file in a location accessible to a specific target; and
   establish a connection with the specific target.

13. The computer program product of claim 12, wherein counting the plurality of targets includes counting a plurality of files, wherein each file corresponds to one target.

14. The computer program product of claim 8, the stored program instructions further comprising program instructions to:

increment the semaphore by an integer equal to a target count, wherein the target count is calculated by adding the file for each tenant of the plurality of tenants to a file for the daemon.

15. A computer system for inter-process communication in a multi-tenant environment, the computer system comprising:

one or more computer processors;

one or more computer readable storage media; and program instructions stored on the computer readable storage media for execution by at least one of the one or more computer processors, the stored program instructions comprising:

program instructions to create a file for each tenant of a plurality of tenants;

program instructions to lock a master lock file prior to establishing a connection with the plurality of tenants, wherein locking the master lock file includes blocking an attachment process until a semaphore for the plurality of tenants is greater than zero;

program instructions to lock a plurality of synchronization files prior to incrementing the semaphore, wherein the plurality of synchronization files correspond to the plurality of tenants, and wherein locking the plurality of synchronization files ensures that the semaphore is only decremented once per tenant;

program instructions to, responsive to a determination that the semaphore for the plurality of tenants is greater than zero, search for a response file corresponding to a specific tenant, wherein the response file includes metadata related to an information channel for communication with the specific tenant and information depicting a communication protocol used corresponding to the specific tenant;

program instructions to, responsive to detecting the response file, unlock the plurality of synchronization files; and program instructions to, responsive to detecting the response file, unlock the master lock file and subsequently establish the connection with the plurality of tenants based, at least in part, on the response file, wherein the response file communicates to a daemon an intent to establish the connection and includes information for establishing the connection.

16. The computer system of claim 15, the stored program instructions further comprising program instructions to:

responsive to detecting the response file, reset the semaphore to a value of zero.

17. The computer system of claim 15, wherein the connection is established at a pre-determined time and is terminated after a pre-determined duration.

18. The computer system of claim 15, wherein the response file contains instructions enabling an attachment process to establish the connection with the specific tenant.

19. The computer system of claim 15, the stored program instructions further comprising program instructions to:

count a plurality of targets to provide a target count;

create a response file in a location accessible to a specific target; and establish a connection with the specific target.

20. The computer system of claim 19, wherein counting the plurality of targets includes counting a plurality of files, wherein each file corresponds to one target.

* * * * *